(No Model.)
A. SCHULTZE.
STREET SPRINKLING SYSTEM.
No. 549,587. Patented Nov. 12, 1895.
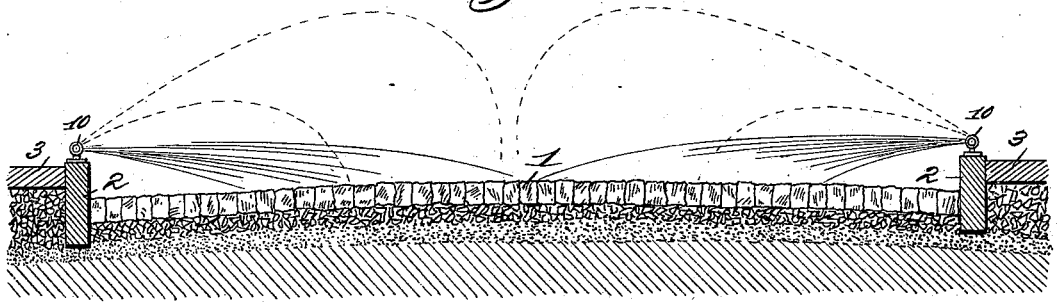
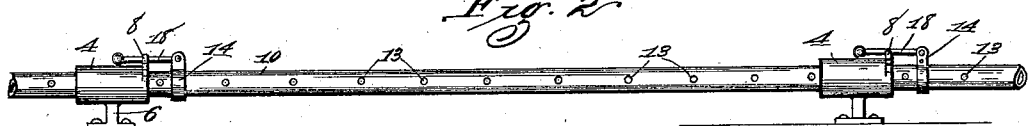
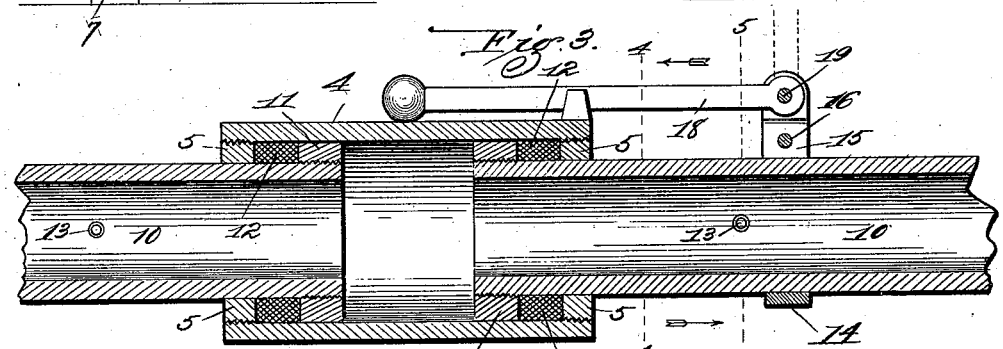
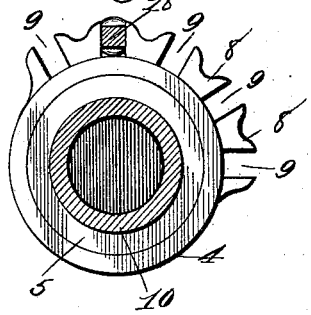
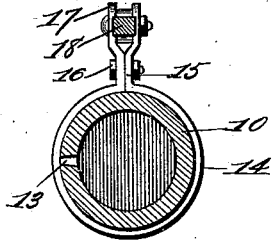
Attest:
N. T. Smith
John L. Jamison
Inventor:-
Adolph Schultze
by Higdon & Higdon & Longan
Attys.

UNITED STATES PATENT OFFICE.

ADOLPH SCHULTZE, OF WASHINGTON, MISSOURI.

STREET-SPRINKLING SYSTEM.

SPECIFICATION forming part of Letters Patent No. 549,587, dated November 12, 1895.

Application filed July 8, 1895. Serial No. 555,208. (No model.)

*To all whom it may concern:*

Be it known that I, ADOLPH SCHULTZE, of the city of Washington, Franklin county, State of Missouri, have invented certain new and useful Improvements in Street-Sprinkling Systems, of which the following is a full, clear, and exact description, reference being had to the accompanying drawings, forming a part hereof.

My invention relates to an improved street-sprinkling system; and it consists in the novel construction, combination, and arrangement of parts hereinafter described and claimed.

In the drawings, Figure 1 is a sectional view of a street, on the curbing of which is located my improved sprinkling system. Fig. 2 is a side elevation of a section of my improved system. Fig. 3 is an enlarged horizontal sectional view of the means employed in making a connection between two lengths of pipe in my improved system. Fig. 4 is a cross-sectional view taken approximately on the indicated line 4 4 of Fig. 3. Fig. 5 is a cross-sectional view taken approximately on the indicated line 5 5 of Fig. 3.

Referring by numerals to the accompanying drawings, 1 indicates an ordinary street or roadway; 2, the curb thereof, and 3 the sidewalks.

4 4 indicate tubular sleeves, the ends of which are interiorly screw-threaded, and located in said ends are rings or collars 5. Said sleeves 4 are preferably cast, and standards 6 are cast integral with said sleeves, said standards being provided with laterally-projecting perforated ears 7, by means of which said sleeves are bolted to the curbing, sidewalk, or other stationary object.

Arranged around a portion of one end of each of these sleeves 4 is a series of projections 8, between which are formed rectangular notches 9.

10 10 indicate lengths of ordinary gas or water pipe, the ends of which are exteriorly screw-threaded, and rings or collars 11 are located upon said screw-threaded ends. The pipes 10 are of such diameter as that they will pass through the rings 5, and the rings 11, located upon the ends of said pipes 10, are of such diameter as that they will fit snugly within the sleeve 4. When the ends of the pipes are properly located within the sleeves and the rings 11 are located upon the ends of said pipe and the rings 5 are located on the ends of the sleeve, suitable packing 12 is located between the rings 5 and the rings 11, thus forming water-tight joints between the pipes 10 and sleeve 4.

Formed in the pipes 10, at suitable distances apart, is a series of apertures 13. Arranged upon each of the pipes 10, adjacent one end thereof, is a strap 14, from which projects upwardly ears 15, through which passes a bolt 16. The upper ends 17 of these ears 15 are separated, and the end of a rectangular arm 18 is pivoted upon a pin or bolt 19, passing through said upper ends. This arm 18 is of such a size as that it will readily pass between any one of the notches 9.

When the pipes, constructed and connected as described, are arranged along upon the curb of a street or along the surface of the ground and proper connections from a suitable water-supply are made to said pipe, the water will enter and pass through said pipes and from them be discharged through the apertures 13.

It is intended where the pipes are located upon the curb of the street that the apertures 13 be so located in the pipe as that the water will be discharged from said apertures in approximately a horizontal plane. Should, however, it be desired to elevate the jets of water as they are discharged, an attendant or operator manually engages the arm 18, raises the same from the notch 9 in which it has been positioned, and throws the same into a horizontal plane. By using said arm 18 as a hand-lever the pipe to which it is attached may be axially rotated to such a position as that the water will be discharged from the pipe on an inclined plane or as indicated by dotted lines in Fig. 1. When the pipe has been rotated to the proper point, the operator allows the handle 18 to swing downwardly and re-engage in one of the notches 9, thus locking the pipe at the point desired. With slight deviation from the exact construction shown and described the device may be advantageously used upon lawns, in gardens, and the like.

A street-sprinkling system of my improved construction may be produced at a minimum cost, is easily placed in position, the jets of water may be discharged at any desired angle, and said system possesses superior advantages in point of simplicity, durability, and general efficiency.

I claim—

In a street sprinkling system, a series of fixed sleeves, projections formed integral with said sleeves and having rectangular notches between said projections, water conveying pipes provided with discharge apertures, the ends of said pipes being located in said sleeves, a strap fixed to each of said pipes, and an arm pivoted between the ends of each of said straps, the same being arranged to axially rotate the pipe and to lock in one of the notches in the end of the sleeve.

In testimony whereof I affix my signature in presence of two witnesses.

ADOLPH SCHULTZE.

Witnesses:
  WM. TERRY,
  JOHN S. HALL.